US005694533A

United States Patent [19]
Richards et al.

[11] Patent Number: 5,694,533
[45] Date of Patent: Dec. 2, 1997

[54] 3-DIMENSIONAL MODEL COMPOSED AGAINST TEXTURED MIDGROUND IMAGE AND PERSPECTIVE ENHANCING HEMISPHERICALLY MAPPED BACKDROP IMAGE FOR VISUAL REALISM

[75] Inventors: John William Richards, Chilbolton; Morgan William Amos David, Farnham, both of United Kingdom

[73] Assignees: Sony Corporation, Tokyo, Japan; Sony United Kingdom Limited, Weybridge, England

[21] Appl. No.: 684,510

[22] Filed: Jul. 19, 1996

Related U.S. Application Data

[63] Continuation of Ser. No. 879,921, May 8, 1992, abandoned.

[30] Foreign Application Priority Data

Jun. 5, 1991 [GB] United Kingdom ............ 9112072

[51] Int. Cl.$^6$ .................................................. G06T 3/00
[52] U.S. Cl. ................................................... 395/125
[58] Field of Search .......................... 395/119, 120, 395/125–127, 129, 130, 135; 348/43, 117, 123; 434/43

[56] References Cited

U.S. PATENT DOCUMENTS

| | | | |
|---|---|---|---|
| 4,600,200 | 7/1986 | Oka et al. ........................ | 395/119 X |
| 4,641,255 | 2/1987 | Hohmann ........................ | 434/43 X |
| 4,645,459 | 2/1987 | Graf et al. ...................... | 434/43 |
| 4,677,576 | 6/1987 | Berlin, Jr. et al. .............. | 395/120 |
| 4,734,690 | 3/1988 | Waller ............................ | 395/127 |
| 4,752,836 | 6/1988 | Blanton et al. ................. | 395/119 X |
| 4,807,158 | 2/1989 | Blanton et al. ................. | 434/43 |
| 4,811,245 | 3/1989 | Bunker et al. .................. | 395/129 |
| 4,821,212 | 4/1989 | Heartz ............................ | 395/126 |
| 4,953,107 | 8/1990 | Hedley et al. .................. | 395/122 |
| 4,954,970 | 9/1990 | Walker et al. .................. | 395/135 |
| 4,965,670 | 10/1990 | Klinefelter .................... | 348/586 |
| 4,970,666 | 11/1990 | Welsh et al. .................... | 395/126 X |
| 4,984,179 | 1/1991 | Waldern ......................... | 364/514 A |
| 4,985,854 | 1/1991 | Wittenburg .................... | 434/43 X |
| 5,177,872 | 1/1993 | Lewis et al. .................... | 33/366 |
| 5,187,754 | 2/1993 | Currin et al. ................... | 382/284 |
| 5,214,512 | 5/1993 | Freeman ........................ | 348/585 |
| 5,255,211 | 10/1993 | Redmond ...................... | 364/578 |
| 5,276,785 | 1/1994 | Mackinlay et al. ............ | 395/127 |
| 5,303,337 | 4/1994 | Ishida ............................ | 395/127 X |

FOREIGN PATENT DOCUMENTS

| | | |
|---|---|---|
| 2 181 929 | 4/1987 | United Kingdom . |
| 2 226 937 | 7/1990 | United Kingdom . |
| WO 88/06775 | 9/1988 | WIPO . |

*Primary Examiner*—Anton W. Fetting
*Attorney, Agent, or Firm*—William S. Frommer; Alvin Sinderbrand

[57] ABSTRACT

A modelling system for producing a 2-D image of a 3-D scene includes a 3-D computer graphics modeler for producing a view from a selectable viewpoint and in a selectable direction of a 3-D computer graphics model of an object for forming a foreground image, a source of backdrop video data, digital video effects apparatus for manipulating the backdrop video data to produce a background image and a compositor for keying the foreground image into the background image to form the 2-D image. The modelling system is able to produce in real time photo-realistic representations of computer models of objects such as buildings and the like in a real world environment. It is possible to include moving foreground objects in the model for virtual reality applications. It is also possible in real time to move around the model by changing the selected viewpoint and/or direction, the modelling system responding to these changes to produce the appropriate output images. A modified modelling system also provides for the inclusion of mid-ground information.

5 Claims, 6 Drawing Sheets

3-DIMENSIONAL MODEL COMPOSED AGAINST TEXTURED MIDGROUND IMAGE AND PERSPECTIVE ENHANCING HEMISPHERICALLY MAPPED BACKDROP IMAGE FOR VISUAL REALISM

This application is a continuation of application Ser. No. 07/879,921, filed May 8, 1992, abandoned

BACKGROUND OF THE INVENTION

1. Field or the Invention

The invention relates to a moldelling system for producing images of three-dimensional (3-D) models.

2. Description of the Prior Art

Modelling systems using computer graphics techniques are well established for creating a 3-D computer model of a building, a car and so on as part of a design process and for producing images from the 3-D computer models. Computer aided design systems based on computer graphics modellers provide not only a means for creating a model as part of a design process, but also a means of visualising a projected design for use in design evaluation, customer reaction, sales campaigns and the like. The use of computer graphics modellers (e.g. general or special purpose computer workstations provided with appropriate software) enables the production of realistic images which are much more effective than blueprints or drawings for evaluating or marketing a design. They avoid the need for producing expensive scale models of the final design.

It is also known, for example, from UK patent application GB-A-2 181 929 (Sony Corporation) to manipulate video data defining the surface texture of an object onto a surface having the shape of the object for generating an image. GB-A-2 181 929 is concerned with simulating a moving object for use, for example, in a flight simulator.

One example of an application for computer graphics modelling is in the field of architectural modelling. In architectural modelling on a computer graphics modeler, data defining a wire frame model of a building structure is entered into the computer. The user is then able to specify his position within the model and to define a direction of view, with the result that the user is able to move through the model to assess the effect of "walking around" the completed building. Usually, it is possible to view internal and external features of the structure. With contemporary computer graphics modellers, it is normally possible to move around the building in real time, the "camera" viewpoint of the image shown on the computer display thus being unconstrained (i.e. the user can view any aspect of the building either internally or externally). For added realism the wire framed model can be rendered to provide solid walls and features. This requires much more calculation, but provides more realistic results at the expense of computational speed. Movement through the structure can still be in real time, but with a frame rate limited to perhaps two frames per second where a high speed graphics accelerator is used.

Even greater realism (so-called "photo realism") can be provided by the inclusion of detailed wall textures, lighting/shading, furniture etc. The level of detail required for photo realism, however, puts a greater load on the computer, with the result that the available frame rate reduces even further.

It is noted however that such tools can be very persuasive in marketing a design and for securing contracts, planning permission etc. Thus, photo realistic rendering is a very desirable feature.

A problem with conventional computer graphics modellers is that they are normally only used for modelling the main structure itself. If, for example, a user of the system chooses an internal view of a building, the room may be highly detailed, but the view out of the window would normally be black (or at best some background colour). By the same token, external views of the building would normally show the model in free space (i.e. without any external ground or views).

With conventional computer graphics modellers it is impractical to model an external scene surrounding the object (building, vehicle etc.) being modelled as the creation, modelling and rendering of the scene surrounding that model would take an impossibly long time. The object of the invention is, therefore, to provide a system which enables the generation of an image which contains not only the 3-D computer graphics model but also contains realistic background scenes.

SUMMARY OF THE INVENTION

In accordance with the invention, there is provided a modelling system for producing an output image of a 3-D scene, the modelling system comprising:

(i) a 3-D computer graphics modeler for producing a view from a selectable viewpoint and in a selectable direction of a 3-D computer graphics model of an object for forming a foreground image;

(ii) a source of backdrop video data;

(iii) digital video effects apparatus for manipulating the backdrop video data to produce a background image; and (iv) means for keying the foreground image into the background image to form the output image.

With a modelling system in accordance with the invention, operating, for example with a computer graphics generators producing images with, for example, a resolution of 1280 pixels×1024 lines or 2048 pixels 1560 lines, and a digital video effects apparatus operating, for example, with a resolution of 1920 pixels 1035 lines, it is possible to produce in real time photo-realistic representations of computer models of buildings and the like in a real world environment. It is also possible to move around the model by changing the selected viewpoint and/or direction, the modelling system responding to these changes to produce the appropriate output images. If required this could be performed in real time. By using captured images for the background, the time and expense of modelling the backdrop is avoided.

Preferably, the digital video effects apparatus manipulates the backdrop video data to produce the background image as representative of the backdrop video data mapped onto the inside of a hemisphere defined so as to surround the object model.

Preferably the digital video effects apparatus comprises a memory for the temporary storage of the backdrop video data and addressing means for providing different addressing of the memory during writing and reading operations to effect the mapping of the backdrop video data onto the inside of the hemisphere.

To reduce the processing required by the digital video effects apparatus, the backdrop video data preferably comprises a plurality of captured video images mapped onto the inside of a cylinder.

In a preferred embodiment, the computer graphics modeler produces a model image composed of model image pixels forming the selected view of the 3-D computer graphics model, which model image is passed to the means for keying as the foreground image, and key signals identifying model image pixels relating to opaque portions of the model, the means for keying responding to the key signals to combine the foreground image pixels relating to opaque portions with background image pixels corresponding to other image positions to form the 2-D image.

In a further preferred embodiment, the computer graphics modeller produces a model image composed of model image pixels forming the selected view of the 3-D computer graphics model and model position information representative of the 3-D model positions to which the model image pixels relate. The modelling system additionally comprises a source of mid-ground video data and, a further digital video effects apparatus for mapping the mid-ground image data onto a 3-D topographical surface and for producing a mid-ground image composed of mid-ground image pixels for at least a selected portion of the mapped mid-ground video data. The second digital video effects apparatus also generates mid-ground position information representative of the 3-D mid-ground positions to which the mid-ground image pixels relate. A 3-D combiner is connected to receive the model image and the mid-ground image for forming the foreground image, the 3-D combiner selecting a pixel for forming the foreground image to be either a corresponding mid-ground image pixel or a corresponding model image pixel, whichever relates to a position nearer to a selected viewpoint.

This further preferred embodiment permits the generation of output images with model, background and mid-ground image data.

The mid-ground image is preferably defined as a view of source mid-ground images providing video texture mapped onto a non-linear relief surface.

The computer graphics modeller is preferably arranged to output view data defining a selected viewpoint and view direction in 3-D space for producing the selected view of the model. The modelling system preferably also comprises a control unit responsive to the view data to provide control data to the digital video effects apparatus for controlling the mapping of the backdrop video data onto the inside of the hemisphere. Where mid-ground is provided, the control unit preferably also provides control data to the further digital video effect generator for controlling the generation of the mid-ground image.

The invention also provides a virtual reality system incorporating a modelling system as defined above.

The above, and other objects, features and advantages of this invention will be apparent from the following detailed description of illustrative embodiments which is to be read in connection with the accompanying drawings.

DESCRIPTION OF THE PREFERRED EMBODIMENTS

The invention provides a system for producing images from a combination of the output of a conventional computer graphics modeler and detailed video background material acquired, for example, by a video camera and manipulated by digital video effects apparatus.

One basic concept behind the invention is to combine the computer graphics output from a computer graphics modeler with video signals (preferably high definition video signals) to provide backdrop images and possibly, in addition, mid-ground image information. An image of a selected view of a computer graphics model is created in the computer graphics modeller. A backdrop is produced from images captured from a camera and manipulated by a digital video effects apparatus before being combined with the output of the computer graphics modeller to produce a final output image. Mid-ground video data can preferably also be processed.

Figure 1:
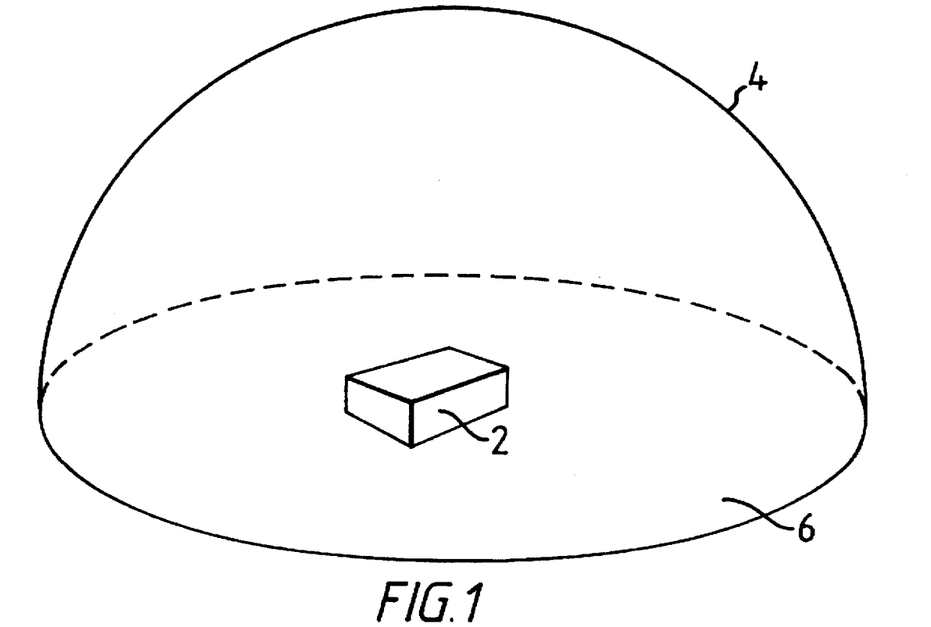
FIG. 1 is a schematic representation of the concept behind the invention.

FIG. 1 is a schematic representation of the concept behind the present invention (described in the context of an architectural modelling system) with the computer graphics model 2 defined in the region of the origin of a hemisphere (or part-sphere) 4. Video data defining a background is defined on the inside surface of the hemisphere. Video data defining a mid-ground is preferably defined on a topographical surface over the base 6 of the hemisphere.

Figure 2:
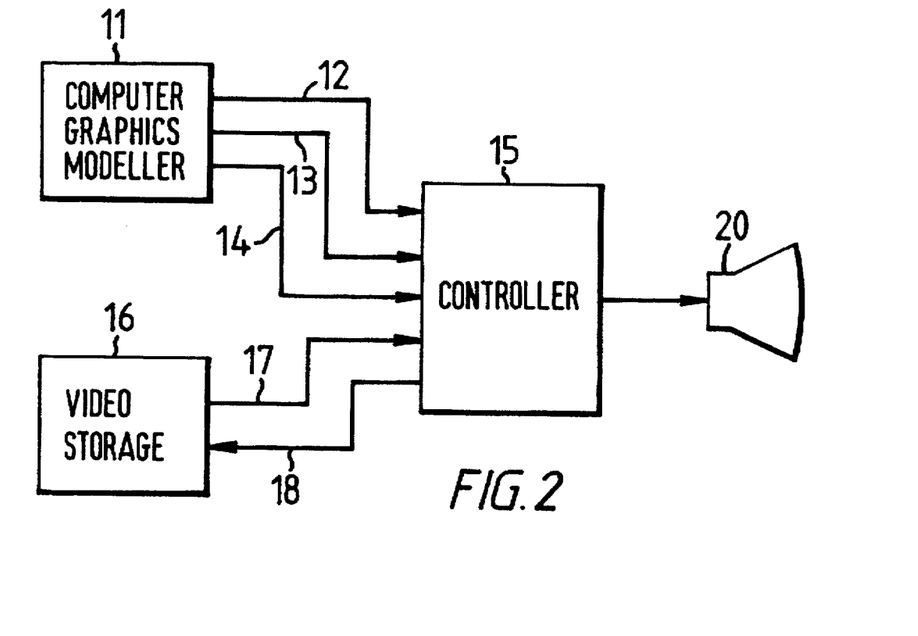
FIG. 2 is a schematic block diagram of this concept.

FIG. 2 is a schematic block diagram illustrating this concept. An image of a 3-D model of an object is produced in a computer graphics modeler (e.g. a computer aided design workstation) 11. Backdrop (and possibly also mid-ground) video information is supplied from video storage 16. The computer graphics modeler 11 outputs image pixel data for the selected view on a first connection 12 and key data on a second connection 13. The key data indicates the parts of the image on the connection 12 which are opaque, and the parts thereof which are transparent (or non-opaque). The computer graphics modeller 11 also outputs view data on a connection 14 indicating the viewpoint and view direction. The data on connections 12, 13 and 14 is input to a controller 15 which includes digital video effects apparatus. The controller 15 responds to the view data on the connection 14 to output control information on a connection 18 to the video storage 16 for accessing video data for forming the backdrop (where appropriate also the mid-ground). This video data is output from the video storage 16 on connection 17 to the controller 15. In the controller 15, the digital video effects apparatus manipulates the video data from the video storage 16 such that it may be combined with the image data on the connection 12 in accordance with the key data on the connection 13 to produce the output image data on the line 19 for display on a display monitor 20.

In a first specific example of a modelling system in accordance with the invention, the video data in the video storage 16 is high definition video relating to the backdrop or far distant scene. In a second specific example of the invention the video storage also includes additional video storage for high definition video relating to a mid-ground scene between the model and the far distant backdrop is provided. These two types of information are processed in different ways.

Consider first the backdrop. This is characterised by being in the far distance. It is assumed to be a flat picture which is projected and/or mapped onto a hemispherical screen to provide a continuous view from any viewing point within or around the model of the building. Preferably, the backdrop is acquired by shooting a number of still video pictures forming a complete 360° view of the intended site of the building. After capture of the still video pictures they are pre-processed by a non-linear digital video effects apparatus prior to storage in the video storage 16 to compensate for any geometric distortion in the picture caused in the lens of the camera used, or by perspective such that all the pictures can be joined together without mis-match. This pre-processing can also include the correction of any image intensity or colour variations caused by changes in aperture settings or lighting conditions when the original images were captured.

Figure 3:
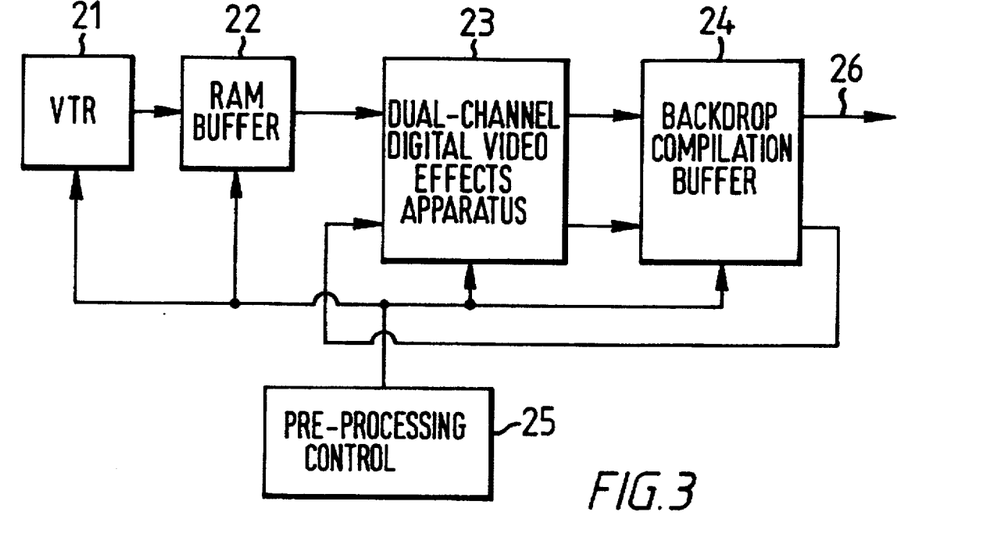
FIG. 3 is a schematic block diagram of apparatus for pre-processing background video images.
Figure 4:
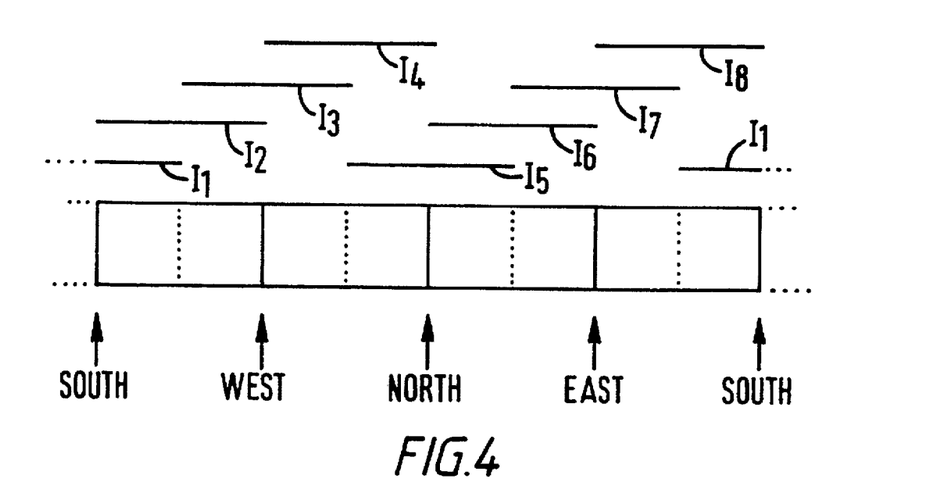
FIG. 4 is a graphical representation of the combining of background images.

FIG. 3 is a schematic block diagram of apparatus for pre-processing the still video pictures. The sequence of still video pictures captured by a high definition video camera is stored in a high definition digital video tape recorder 21 or other high definition video picture storage medium. These video pictures are preferably stored in digital form, although they could be stored in analogue form and converted to digital form on output from the video tape recorder 21. The pictures are output one at a time, under control of a pre-processing controller 25, for storage in digital form in a Random Access Memory (RAM) buffer 22. The pre-processing controller can be in the form of a computer workstation with appropriate control software, although it could form an integral part of a non-linear digital video effects apparatus 23. Each digital picture is then manipulated in turn by a digital video effects apparatus 23, which is preferably a high definition non-linear digital video effects apparatus to map the pictures onto the inside of a tube configured to surround the model generated by the computer graphics modeler 11 in the modelling system of FIG. 2. The pre-processing controller 25 is provided with data defining the corrections which need to be applied to the input images in order to correct for lighting effects and lens induced distortion introduced at the time of capture of the original images. The correction data can be established manually by a user of the system or could, conceivably, be generated automatically using test cards or the like. The manipulated digital video picture is then output to a backdrop compilation buffer In order to provide a smooth transition between the constituent images, the video images ($I_1$–$I_8$) are preferably overlapped, or merged into one another as illustrated in FIG. 4. Note that although FIG. 4 shows a 50% overlap between adjacent images, a greater or lesser degree of overlap may also prove perfectly satisfactory in some circumstances. Accordingly, by providing positional information to the backdrop manipulation buffer 24, the controller 2-D enables selected portions of the backdrop already assembled in the backdrop buffer 24 to be fed back to the high definition digital video effects apparatus 23 for processing along with the current picture being manipulated. As illustrated in FIG. 3 the digital video effects apparatus is a dual-channel device in the sense that each of the current and previous images can be manipulated side-by-side. Note that for colour processing each "channel" includes sub-channels for the separate channels (e.g. red, green, blue). The manipulated images can then output to the backdrop compilation buffer where they are assembled to form the backdrop. The backdrop compilation buffer can include a high definition digital video recorder, tape streamer, or other high definition storage medium. The backdrop can be previewed on a monitor (not shown) via output 26. The backdrop stored in the backdrop storage 24 can be regarded as a circular scene or tube (note the points of the compass in FIG. 4) surrounding the model produced by the computer graphics modeler of FIG. 2. Note that instead of a two-channel digital video effects apparatus, a simpler one-channel apparatus may be used with each separate image being processed sequentially. Note also that instead of separate images being used, the backdrop could be generated from a panorama camera with appropriate manipulation of the image to put the backdrop into an appropriate format.

Figure 5:
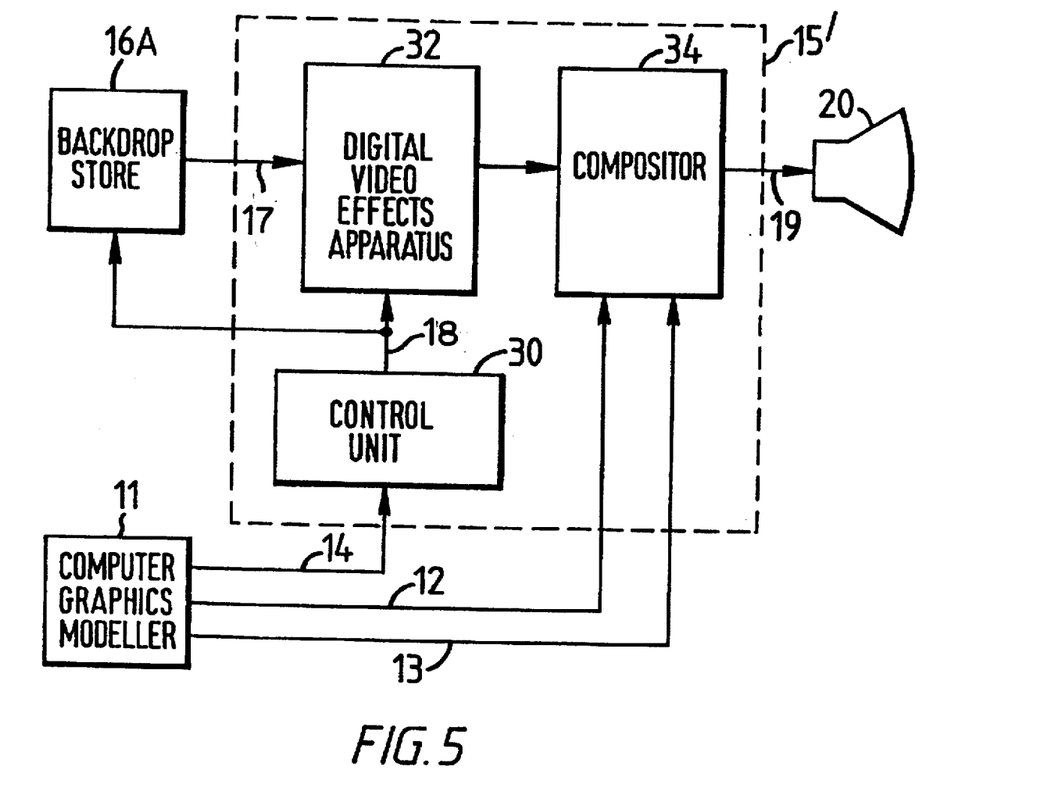
FIG. 5 is a schematic block diagram of a first apparatus in accordance with the invention.

FIG. 5 is a schematic block diagram of a first specific example of a modelling system in accordance with the invention. The video storage 16A contains the backdrop information stored in the backdrop storage 24 of FIG. 3. The controller 15' comprises a control unit 30, a digital video effects unit 32 and a compositor 34. The digital video effects unit 32 is connected to receive input video data from the video storage 16H and to provide manipulated video data in the form a backdrop image to the compositor 34. The control unit 30 is connected to receive view data representative of the viewpoint position and direction in 3-D space from the computer graphics modeler 11 via the connection 14.

The computer graphics modeler can be a conventional computer workstation with appropriate 3-D modelling software. The computer graphics workstation can include conventional user input means including one or more of the following, namely a keyboard, mouse, graphics tablet, light pen and so on. The computer graphics workstation will conventionally also include a monitor for indicating the selected image of the model but without the background information with which the model image is to be combined. In principle, a conventional computer aided design software package or other conventional 3-D modelling software can be used for generating the model image. Where the conventional computer graphics modelling software does not provide an output of the view data representative of the viewpoint position and direction in 3-D space, or a key signal indicating which parts of the object are opaque and which parts are non-opaque, the computer graphics modelling software will need to be modified in order to provide these features. Any computer graphics modelling software which provides an image of a model, will have the data available which is representative of the viewpoint position and direction in 3-D space. Also, a computer graphics modelling system which provides for rendering of surfaces will have data available about which of those surfaces are opaque and which are non-opaque. Accordingly, it will be apparent to one skilled in the art how to modify the computer graphics modelling software in order to provide an output of these data.

The control unit 30 includes control logic and data to respond to the view data to determine address information for addressing appropriate digital video data from the video storage 16 and for determining the manipulation to be performed by the digital video effects unit 32. Specifically, the manipulation performed by the digital video effects unit 32 is to map the tubular backdrop onto the inside of a hemisphere (or other circular surface which is closed at the top). The background image pixels forming the background image generated by the digital video effects apparatus 32 is supplied to a compositor 34.

The compositor 34 receives pixel data (intensity colour etc.) forming a model image (i.e. the selected view of the object being modelled by the computer graphics modeler 11) via a connection 12 and associated key data from the computer graphics modeler 11 via the connection 13. The key data transmitted via the connection 13 identify the pixels of the view of the object being modelled which contribute to opaque portions of the object and pixels which do not contribute to opaque portions of the object.

From the key signals on the connection 13, the compositor 34 controls the keying of the pixels of the model image into the backdrop image output by the digital video effects unit 32 to produce an output image for display on a monitor 20. Thus the compositor provides a means for keying which responds to the key signals to combine the foregound image pixels relating to opaque portions of the model with background image pixels corresponding to other image positions to form an output image.

Figure 6:
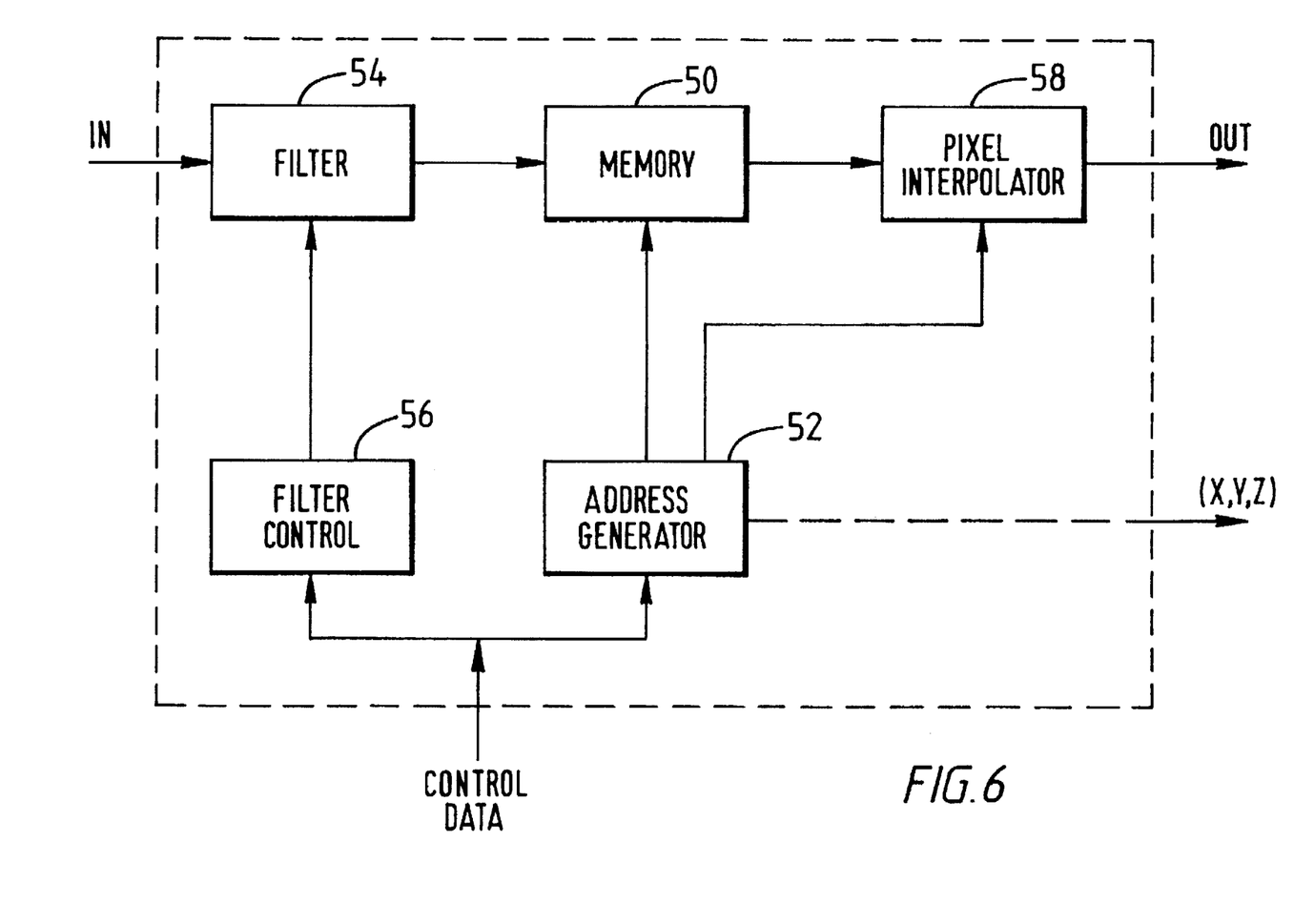
FIG. 6 is a schematic block diagram of a digital video effects apparatus.

FIG. 6 is a schematic block diagram of one-channel or sub-channel of a typical digital video effects generator 32 which can be used in the modelling system of FIG. 5- A similar digital video effects generator could also be used as one-channel or sub-channel of the apparatus 23 in FIG. 4. As the digital video effects generator can be conventional, it will not be described in detail herein.

In summary, the digital video effects generator operates as follows. A video signal representing each source image to be manipulated is input into the digital video effects generator 32. Manipulation of the source image(s) is performed in the digital video effects generator by controlling either the read or the write addresses to a memory 50 where temporary storage of the image data is effected. As illustrated in FIG. 6, read side addressing is employed, this being controlled by the address generator 52. As a by-product of the address generation process the address generator can output co-ordinate information (X, Y, Z) indicating the position in 3-D space to which each pixel relates. This feature is not, however required for the digital video effects apparatus in FIG. 5.

A pixel interpolator 58 enables output pixel values to be computed where the address generator 52 does not generate a one-to-one mapping between a storage location in the memory 50 and an output pixel. The addresses produced by the address generator 52 include an integer portion for addressing the memory 50 and a fractional portion for controlling the pixel interpolator 58.

As, in the processing of images, the manipulation may involve compression of the image and in the absence of corrective measures, compression of an image can give rise to aliasing which will degrade the quality of the output image, a filter 54 is provided to compensate for the effects of compression. Filter control 56 determines local scaling factors For controlling the filter 54.

The address generator 52 determines addresses for mapping the pixel data out of the memory 50 in accordance with a particular manipulation to be performed in response to control data from the control unit 30. The control data supplied by the control unit 30 to the digital video effect generator includes a definition of the mapping which needs to be performed such that the address generator may generate the appropriate addresses.

The control unit 30 can be in the Form of a personal computer or computer workstation with appropriate software and can be provided as an integral part of the digital video effects generator or can be provided as a special purpose piece of hardware.

The function of the control unit 30 could alternatively be integrated in the computer graphics modeler as hardware and/or software logic, so that a separate control unit would not be necessary, the computer graphics modeler providing the necessary control signals to the digital video effects apparatus and the other elements of the modelling system directly.

Thus the modelling system of FIG. 5 is able to produce an output image of a scene comprising a selected view of the model from the computer graphics modeler with a background visible through windows or the like From video images manipulated by digital video effects apparatus in order to provide a realistic representation of the model in its environment. Using current computer graphics generators producing images, typically with a resolution of 1280 pixels×1024 lines or 2048 pixels×1560 lines, and high definition digital video effects apparatus, typically operating with a resolution of 1920 pixels×1035 lines it is possible to produce in real time photo-realistic representations of computer models of buildings and the like in a real world environment. If desired, it is possible to move around the model in Peal time by changing the selected viewpoint and/or direction, the modelling system responding to these changes to produce the appropriate output images.

Figure 7:
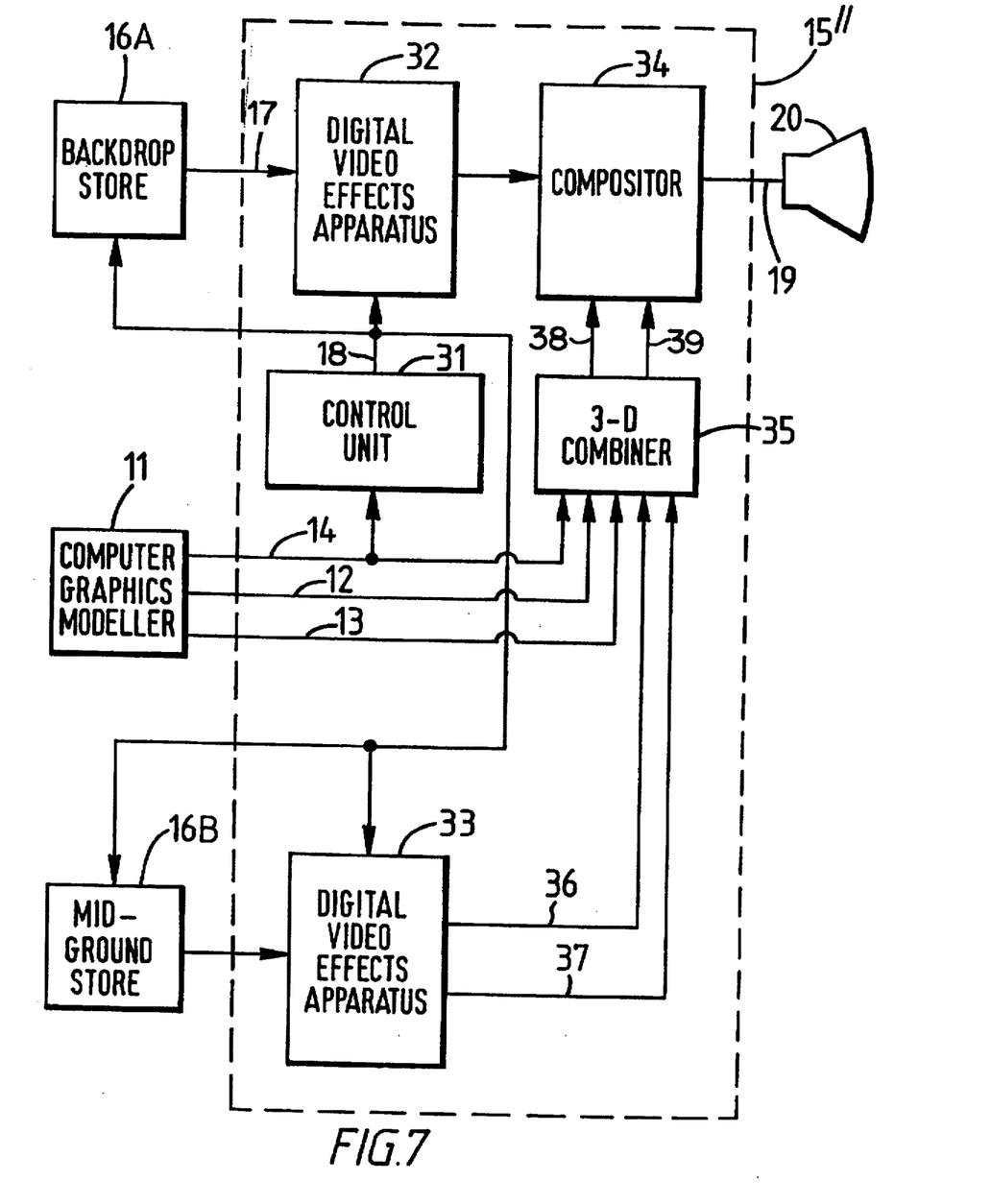
FIG. 7 is a schematic block diagram of a second apparatus in accordance with the invention.

FIG. 7 illustrates a further specific example of a modelling system in accordance with the invention. In this example, in addition to the backdrop video information, mid-ground video information is also provided.

The mid-ground video information relates to the ground surface between the distant backdrop and the object modelled by the computer graphics modeller. In order to provide realistic rendition, this mid-ground video information will require "landscaping" to simulate surface contours. The view of the mid-ground could change quite dramatically depending on the position and orientation of the viewpoint. Preferably, the mid-ground is comprised of aerial photographs which are combined to form a two dimensional array of frames. The frames may be combined in either a tessellating manner or an overlapping manner. Apparatus similar to that illustrated in FIG. 4, but arranged to provide for the overlapping or tessellating in two dimensions of the two-dimensional array of frames forming the mid-ground, can be used for this purpose. If desired the combined array of frames can be retouched with an appropriate video retouching system.

The significant difference between the mid-ground and the backdrop is that, especially in the locality of the model, a 3-D relief surface of the ground needs to be created for realism. Shading and illumination of this surface is also preferably incorporated. This can be achieved with a non-linear digital video effects unit in the manner explained in an article by J. Richards et. al. entitled "A real time texture mapping system—DME 9000" published in the proceeding of the 16th International Television Symposium, Montreux 1989, at pages 675 to 689.

In many cases the mid-ground need not extend to the backdrop. However, where this is desired, the mid-ground preferably tends towards a flat plane towards the edges of the mid-ground (i.e. at extreme viewing distances) so that it matches more easily with the backdrop. If required, blending of the video at the intersection of backdrop and mid-ground could be accomplished by a method similar to that shown in FIG. 4, possibly with the ability to re-touch elements of the mid-ground texture.

FIG. 7 is a schematic block diagram of the second example of a modelling system in accordance with the invention, which second example is able to combine a computer graphics model with backdrop and mid-ground information. In this specific example, a model image and a mid-ground image are combined to form a foreground image and then this is combined with the backdrop image in a controller 15".

Backdrop information, pre-processed as described above with regard to FIGS. 3 and 4 is stored in the backdrop store 16A. This is processed as in the example of FIG. 5 by a non-linear digital video effects generator 32 in order to map the backdrop into the inside of the hemisphere. As in the example of FIG. 6, this occurs under the control of a control unit, in this example labelled 31. The control unit 31 receives control instructions in the form of view data defining the viewpoint position and direction with regard to the computer graphics model produced by a computer graphics modeler 11.

Pre-processed flat mid-ground video information is stored in a mid-ground video store 16B. Contouring is applied to the mid-ground video information by a digital video effects unit 33 in the manner described in the aforementioned article by J. Richards. Control information specifying the part of the mid-ground video information to be read out of the mid-ground store 16B and the mapping to be performed by the non-linear digital video effects unit 33 is supplied in accordance with the view position and direction by the control unit 31. The output of the digital video effects unit 33 is in the form of pixel information for a mid-ground image on a connection 36 and co-ordinate information identifying the coordinates in 3-D space (e.g. x, y and z co-ordinates in a cartesian system) to which the pixels relate on a connection 37. Note that the co-ordinates can be supplied from the address generator 52 of the digital video effects generator described with reference to FIG. 6. The pixel and positional information on the connections 36 and 37 is supplied to a 3-D combiner 35. In addition, the computer graphics modeler 11 supplies to the 3-D combiner pixel information forming a model image over a first connection 12, co-ordinate information identifying the co-ordinates in 3-D space to which each pixel relates over a further connection 13, and view data specifying the viewpoint and direction of view in 3-D space over the connection 14.

The 3-D combiner can be a conventional 3-D combiner which uses the co-ordinate information, in combination with the view data to determine whether pixels relating to the model, or pixels relating to the mid-ground, are in the line of sight from that viewpoint (i.e. whether the point in 3-D space to which model pixel at a particular image position relates is nearer to the viewpoint in a given line of sight than the point in space to which a mid-ground pixel relates at the same pixel position). This can readily be determined example, or example, conventional ray tracing algorithms.

The output from the 3-D combiner 35 is in the form of a foreground image, comprising the combination of the model, and a mid-ground image and key information identifying which pixels in the intermediate image contribute to either the model of the mid-ground and which pixels do not contribute to either. The intermediate image pixels information is output from the 3-D combiner 35 to a compositor 34 via a connection 38. The key information is output from the 3-D combiner 35 to the compositor 34 via the connection 39.

The compositor uses the key information supplied on the connection 39 to control the keying of the foreground image into the backdrop image by masking those pixels of the backdrop which are obscured by the foreground. The combined output image is supplied via line 19 fop display on a display monitor 20.

Thus the modelling system of FIG. 7 is able to produce a 2-D image of a scene comprising a selected view of the model from the computer graphics modeler with a background and mid-ground visible through windows or the like from video images manipulated by digital video effects apparatus in order to provide a realistic representation of the model in its environment. As with the modelling system of FIG. 5, the modelling system of FIG. 7 is able, using current computer graphics generators and high definition digital video effects units, to produce in real time photo-realistic representations of computer models of buildings and the like in a real world environment. It is possible to move around the model in real time by changing the selected viewpoint and/or direction, the modelling system responding to these changes to produce the appropriate output images.

The invention has been described above, by way of example only, with reference to two specific embodiments. However, it will be apparent to one skilled in the art that many modifications and/or additions are possible within the scope of the invention.

For example, in the above description, a single combined image is generated of the scene being modelled at any one time. However, two images could be generated from slightly different viewpoints separated by an-appropriate distance to simulate human binocular vision for creating stereo video, using conventional techniques e.g. with colour coding on a single image screen, or on separate screens. The separate images could be generated by duplicating appropriate equipment and/or by multiplexed processing as will be apparent to one skilled in the art.

The invention has been described above with reference to examples relating to architectural modelling. However, it will be apparent that the invention has much wider application than this. For example, the computer graphics modeler could provide an immediate environment for a "virtual reality" system. "Virtual reality" systems include means for simulating a complete user environment and, in addition, means for sensing a user's direction of view and/or movement, to create a realistic impression that the user is actually in the environment being simulated. Thus, for example, the system can be used for flight simulation and/or flight simulator type games. Rather than reproducing an image of the environment on a single television screen, virtual reality systems are typically provided with two image screens located directly in front of the user's line of vision within a helmet. The system includes means for detecting the orientation of the user's helmet (using positional and orientation sensors such as gyroscopes and/or magnetic fields devices). As the user turns his head, the sensors provide signals to the processor of the system which then changes the view which is presented to the user via the television screens. In this way it is possible for a user to survey the simulated environment. In conventional systems, the simulated environment is in the form of a computer generated model. However, in order to provide real time operation, the environment can only be simulated at a relatively simple level. Current systems do not nearly approach photo-realism in the environment. The present invention provides a mechanism whereby photorealism can be achieved by relieving the computer graphics modeller of the need to simulate the complete environment. The computer graphics modeller can then be used for simulating a foreground which can include moving foreground images (e.g. for simulating for example a combat situation in a virtual reality game), the background and mid-ground being generated from captured video information as described above with respect to the previous embodiments.

Figure 8:
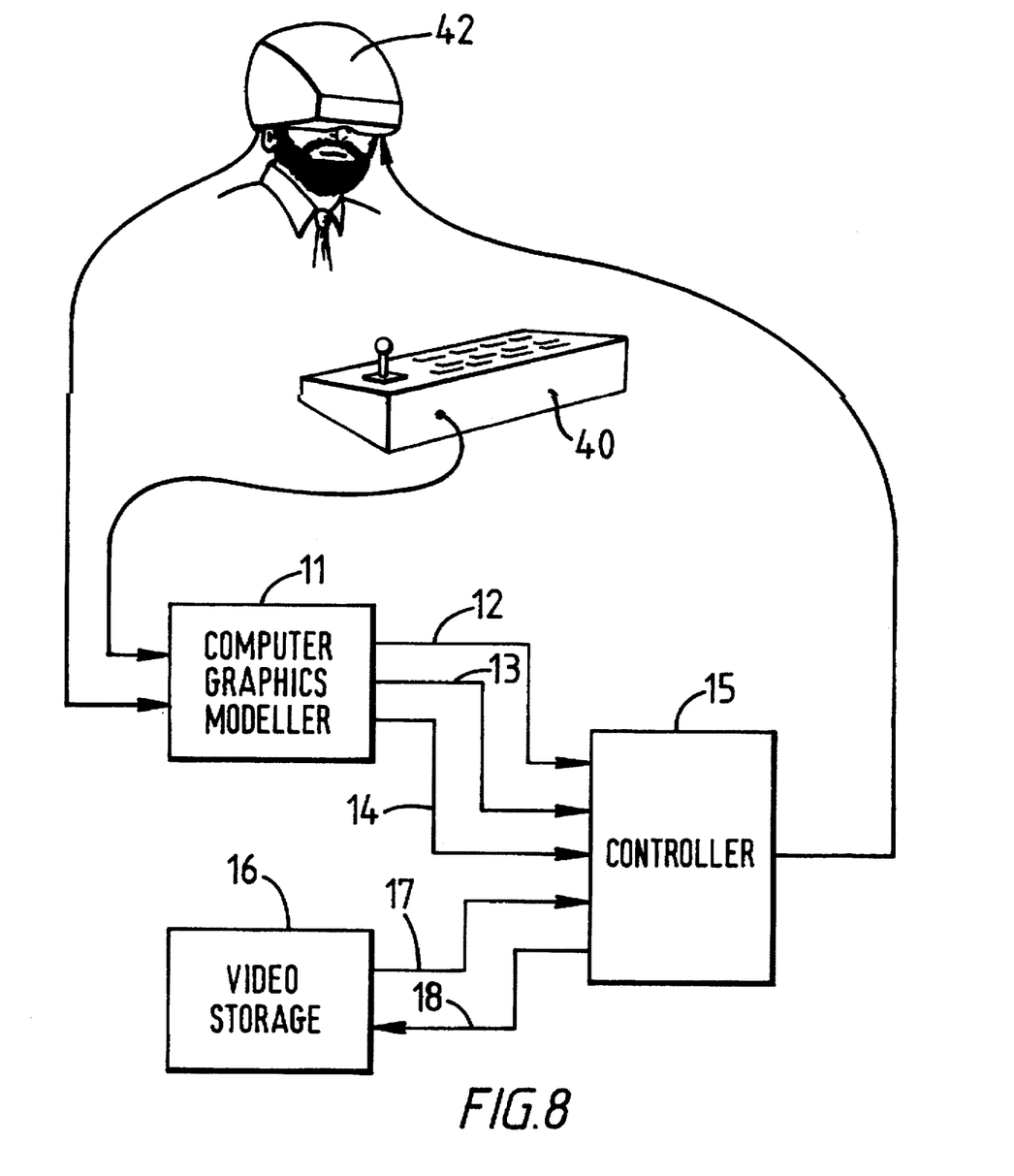
FIG. 8 is a schematic representation of the concept of the invention applied to a virtual reality system.

FIG. 8 illustrates the concept of a modelling system in accordance with the invention used as a virtual reality system. Data can be input to a computer graphics modeler 11 from a keyboard 40 and/or other user inputs (e.g. the control panel layout of a vehicle such as a car or aircraft), and in addition from position and/or orientation sensors in a helmet 42 worn by the user. The data from the keyboard 40 and from the user's helmet 42 is input to the computer graphics modeler 11 which responds thereto in order to generate a foreground model for the virtual reality system. The foreground model could, for example, include high definition foreground animation of characters and/or devices which move in the foreground. Thus, the foreground may be an active rather than a passive foreground. The background and mid-ground information, which is provided from video storage 16, is essentially passive. However, the merging of the foreground image with the selected portion of the background images is performed in the controller 15 as described above with respect to the previously described examples. The foreground, background (and where appropriate mid-ground) images can be updated at an appropriate rate and in real time to simulate real-time moving scenes. The output of the controller 15 is provided to the helmet 42 for driving one or more video display devices. The system can be arranged to provide stereo images for driving a separate visual display device for each of the user's eyes by generating two sets of images for respective viewing positions separated by an appropriate distance to simulate human binocular vision.

Thus the invention enables moving objects to form at least part of the foreground model, providing photo-realism in virtual reality applications.

Although illustrative embodiments of the invention have been described in detail herein with reference to the accompanying drawings, it is to be understood that the invention is not limited to those precise embodiments, and that various changes and modifications can be effected therein by one skilled in the aft without departing from the scope and spirit of the invention as defined by the appended claims.

We claim:

1. A modelling system for producing an output image of a 3-D scene, the modelling system comprising:

a 3-D computer graphics modeller for producing a computer-generated foreground architectural image that is a 2-dimensional projection of a 3-dimensional architectural object as viewed from a selectable viewpoint and in a selectable direction;

a source of video data;

digital video effects apparatus for receiving the video data from the source of video data and for projecting the received video data by mapping said video data onto a tube, mapping the tube onto a hemisphere to form a compressed image and correcting for artifacts introduced into the compressed image to produce a synthesized background image so as to surround the 3-dimensional architectural object; and means for composing the output image from the computer-generated foreground architectural image and the synthesized background image on the basis of key signals supplied to the means for composing from the 3-D computer graphics modeller.

2. A modelling system as claimed in claim 1, wherein, before the video data is received by the digital video effects apparatus, the video data comprises a plurality of still video images.

3. A modelling system as claimed in claim 1, wherein the output image includes stereoscopic images of the 3-D scene.

4. A modelling system as claimed in claim 1, further comprising sensing means for sensing at least one of movement and a direction of view of a user of the modelling system; and wherein the 3-D computer graphics modeller includes means, responsive to the sensing means, for determining the selected viewpoint and the selected direction.

5. A modelling system for producing an output image of a 3-D scene, the modelling system comprising:

a 3-D computer graphics modeller for producing a computer generated foreground architectural image that is a 2-dimensional projection of a 3-dimensional architectural object as viewed from a selected viewpoint and in a selected direction, the architectural image being formed of first image pixels, the computer graphics modeller also producing first position information indicative of positions of the first image pixels;

a source of first video data;

first digital video effects apparatus for receiving the first video data from the source of first video data and for projecting the received first video data by mapping said video data onto a tube, mapping the tube onto a hemisphere to form a compressed image and correcting for artifacts introduced into the compressed image to produce a synthesized background image so as to surround the architectural object;

a source of second video data;

second digital video effects apparatus for projecting the second video data onto a 3-dimensional topographical surface to form a 3-dimensional landscape and for producing a third image that is a 2-dimensional projection of the 3-dimensional landscape as viewed from the selected viewpoint and in the selected direction, the 3-dimensional topographical surface being defined between the 3-dimensional architectural object and the synthesized background image, the third image being formed of third image pixels, the second digital video effects apparatus also producing second position information indicative of positions of the third image pixels;

a 3-D combiner connected to receive the computer-generated foreground architectural image and the third image for forming a combined image from the computer generated foreground architectural image and the third image on the basis of the first and second position information; and means for composing the output image from the combined image and the synthesized background image on the basis of key signals supplied to the means for composing from the 3-D combiner.

* * * * *